(12) United States Patent
Watanabe et al.

(10) Patent No.: US 7,215,761 B2
(45) Date of Patent: May 8, 2007

(54) INFORMATION PROCESSING TERMINAL, OPERATION CONTENT NOTIFYING PROGRAM AND METHOD FOR OPERATION CONTENT NOTIFYING

(75) Inventors: Yoshikazu Watanabe, Kawasaki (JP); Ken Hayashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/613,991

(22) Filed: Jul. 8, 2003

(65) Prior Publication Data
US 2004/0022401 A1 Feb. 5, 2004

(30) Foreign Application Priority Data
Jul. 31, 2002 (JP) ............................. 2002-223546

(51) Int. Cl.
*H04M 1/00* (2006.01)
(52) U.S. Cl. ............... 379/390.01; 379/419; 455/550.1
(58) Field of Classification Search .................. 455/564
See application file for complete search history.

(56) References Cited

U.S. PATENT DOCUMENTS

| 5,812,648 | A | 9/1998 | Wanner |  |
|---|---|---|---|---|
| 5,937,360 | A | 8/1999 | Nishiyama et al. |  |
| 6,223,058 | B1 * | 4/2001 | Sudo et al. | 455/564 |
| 6,411,198 | B1 | 6/2002 | Hirai et al. |  |

FOREIGN PATENT DOCUMENTS

| DE | 198 29 933 A1 | 1/2000 |
| EP | 0 951 159 A2 | 10/1999 |
| EP | 0 961 461 A1 | 12/1999 |
| EP | 1 193 954 A1 | 4/2002 |
| JP | 02-250546 | 10/1990 |
| JP | 8-250945 | 9/1996 |
| JP | 08-250945 | * 9/1996 |
| JP | 10-112743 | 4/1998 |
| JP | 10-177454 | 6/1998 |
| JP | 2001-53854 | 2/2001 |

OTHER PUBLICATIONS

Motorola Timeport 270c wireless phone user's guide, Copyright 2001 Motorola, Inc. (pp. 1-5, 116 and 117).*
Communication dated Oct. 15, 2003 from the European Patent Office, including a European Search Report.
Chinese Office Action in related Chinese Application No. 03149834.5 issued by the Patent Office of the People's Republic of China, including English translation thereof (6 pages), dated Oct. 1, 2004.
Japanese Office Action mailed Oct. 17, 2006, in Japanese Patent Application No. 2002-223546 which corresponds to present above-identified U.S. Appl. No. 10/613,991 (2 pages, Eng. Translation 3 pages).

* cited by examiner

*Primary Examiner*—Sinh Tran
*Assistant Examiner*—Walter F Briney, III
(74) *Attorney, Agent, or Firm*—Staas & Halsey LLP

(57) ABSTRACT

An information processing terminal of the present invention notifies a user that a call receiving sound-level set by operating a rotary operation unit provided on a main body of the information processing terminal comes to a maximum or minimum value.

12 Claims, 9 Drawing Sheets

INFORMATION PROCESSING TERMINAL, OPERATION CONTENT NOTIFYING PROGRAM AND METHOD FOR OPERATION CONTENT NOTIFYING

BACKGROUND OF THE INVENTION

1. Field of the Invention

The present invention relates to a technology of previously notifying of an output content outputted from a terminal.

2. Description of Related Art

A loudspeaker (including a buzzer) is provided in a terminal such as a personal computer (which will hereinafter be abbreviated to PC), a PDA (Personal Digital Assistant), a mobile phone etc which have remarkably spread over the recent years.

Each of these devices is provided with an operation unit for controlling a level of an output sound from the loudspeaker. A user has hitherto obtained a proper sound-level by controlling the level of the sound outputted from the loudspeaker in a way that manipulates the operation unit provided on the terminal.

An example of the operation for adjusting the sound volume, as the terminal is mobile phone, is explained. Note that the operation unit is supposed to control the call receiving sound-level of the mobile phone. Namely, the user sets the call receiving sound-level by manipulating the operation unit.

A next call receiving sound is to be outputted from the loudspeaker at the set sound-level, when the user sets a volume of the call receiving sound to a predetermined level.

SUMMARY OF THE INVENTION

By the way, it is possible to be applied a rotary operation unit (the prior arts) and a push-button operation unit as the operation unit described above. This rotary operation unit is manipulated by rotating the operation unit.

However, some of rotary operation unit may rotate limitlessly without stopping in a predetermined position. Therefore, the user is hard to grasp a state of setting by manipulation only from an operational volume of the rotary operation unit. The user must visually confirm a setting content displayed on a display in order to grasp the setting state.

Further, if the user does not grasp the set-level, it might happen that an output is given with an output value contrary to a sound is outputted with a sound-level value contrary to an intention of the user. For example, in a case where the terminal is a mobile phone and the user does not grasp the setting level of the call receiving sound-level, it might happen that the call receiving sound is outputted at the maximum sound-level in a train or a building.

Accordingly, it is a primary object of the present invention, which was devised under such circumstances, to provide an information processing terminal enabling a user to easily recognize an output state at the present.

It is another object of the present invention to provide an information processing terminal capable of preventing an unexpected output.

To accomplish the above objects, according to one aspect of the present invention, an information processing terminal comprises a rotary operation unit provided on a terminal stored with a variety of functions and performing a various operations of the terminal by a rotational operation thereof, an output unit outputting an output based on an operation result of the rotary operation unit, a rotational volume measuring unit measuring a rotational volume of the rotary operation unit, and an operation content notifying unit notifying of a content of the operation result causing the output in accordance with a result of measurement by the rotational volume measuring unit.

Herein, the terminal may be exemplified such as a personal computer, a PDA, a mobile phone and so forth.

The information processing terminal of the present invention is capable of notifying of a content of the operated result of the rotary operation unit. The information processing terminal of the present invention is therefore capable of obviating such an inconvenience that the user becomes unrecognizable of the operation state simply from a sense of the operation because of the rotary operation unit rotating limitlessly.

The information processing terminal of the present invention may further comprise a timer unit setting the operation content notifying unit to notify at a predetermined time.

For instance, this timer unit may set so that the operation content notifying unit operates at an interval of three hours. Further, the timer unit is capable of setting in a way that makes the operation content notifying unit operate invariably at a predetermined time.

Accordingly, the setting of this timer unit is done before a time when getting on the train or before a meeting etc will start, whereby an unexpected output from the output unit can be prevented.

Preferably, in the information processing terminal of the present invention, the operation content notifying unit may notify that an output content outputted from the output unit is a maximum or minimum.

Given herein is an example where the terminal is the mobile phone, the output unit is the loudspeaker for outputting the call receiving sound, and a voice (including an electronic sound etc) notification of the operation content is made. Note that the rotary operation unit in this case controls a level of the call receiving sound outputted from the loudspeaker (including a buzzer).

The operation content notifying unit according to the present invention notifies that the call receiving sound-level is set to a maximum value by manipulating the rotary operation unit. With this scheme, the user is able to recognize that the call receiving sound-level is set to the maximum value. Then, the user, if necessary, decreases the set level of the call receiving sound volume till a next call arrives. Accordingly, the information processing terminal of the present invention enables the user to take such a measure beforehand down to a sound-level of the unexpected receiving call.

Other than the above-mentioned, the operation content notifying unit according to the present invention may be constructed to notify that the output content outputted from the output unit is a minimum. Note that the output content according to the present invention is not limited to the call receiving sound-level. The output content can be exemplified otherwise such as a voice level of speech received, a luminance on a screen displayed on the display device, a sound, the light and so on.

Further, it is also preferable that the output unit according to the present invention serves as a display device for displaying characters and patterns. Then, desirably, the operation content notifying unit in this case changes the luminance on the screen of the display device and notifies of this operation content.

With this scheme, even in a case where the user exists in such a place that the sound should not be outputted or the terminal is set so as not to output the sound, the user is able to surely recognize the operation content.

According to another aspect of the present invention, there can be provided a control method in the information processing terminal described above.

According to still another aspect of the present invention, there can be provided a program read by a computer and other devices and machines to execute any one of the processes in order to actualize the control method described above.

According to a further aspect of the present invention, there can be provided a recording medium recorded with the above program readable by the computer and other devices and machines.

Based on the above-mentioned, according to the present invention, it is possible to provide the information processing terminal and the operation content notifying program that enable the user to easily recognize the output state at the present.

Moreover, according to the present invention, it is possible to provide the information processing terminal and the operation content notifying program that are capable of preventing the unexpected output from the terminal.

According to a further aspect of the invention, there is provided a storage medium recorded with a program executed by the computer or other device or machine to actualize any one of the functions described above.

DETAILED DESCRIPTION OF THE PREFERRED EMBODIMENT

A preferred embodiment of the present invention will hereinafter be described with reference to the accompanying drawings.

<Brief Explanation>

Figure 1:
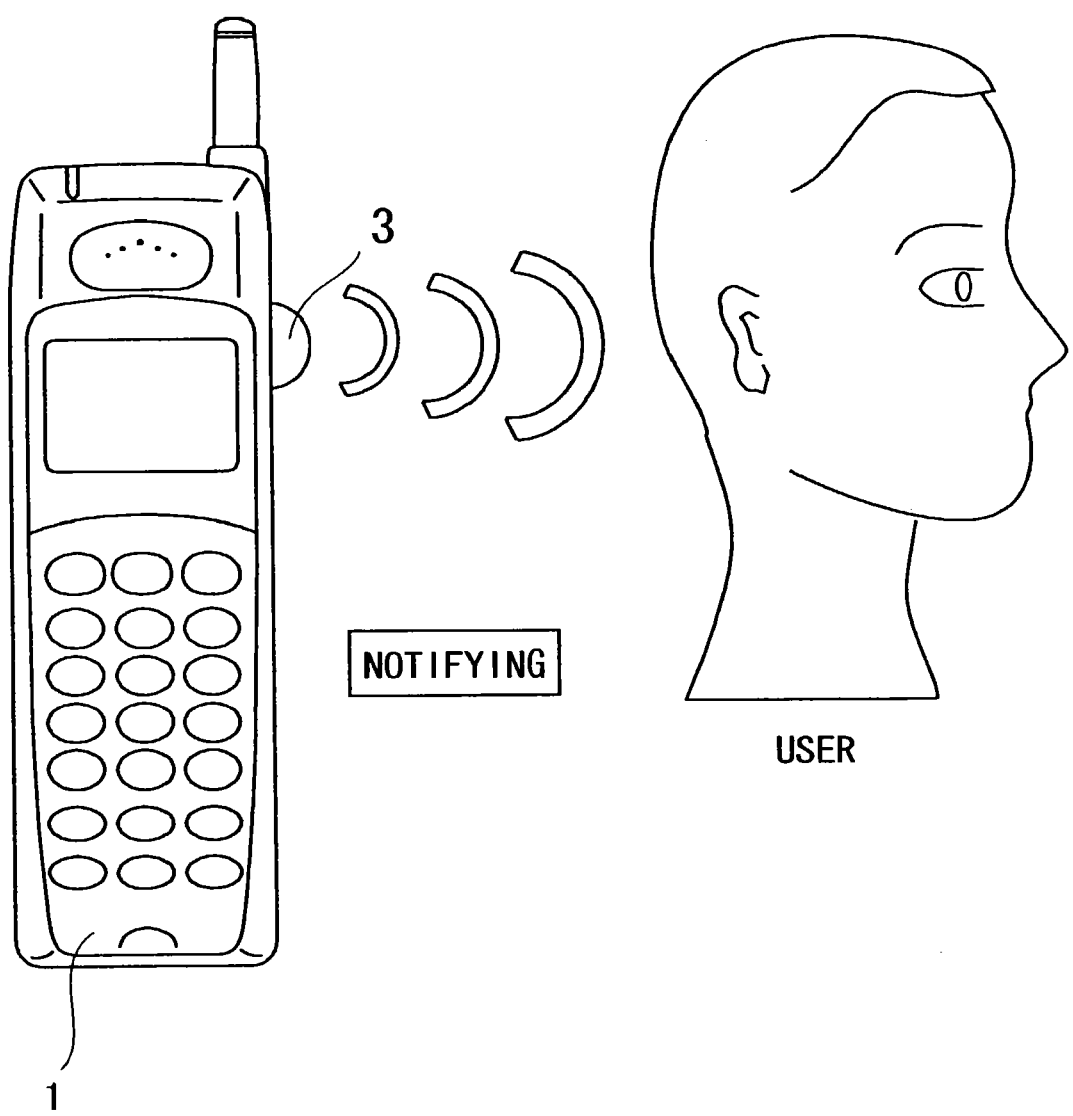
FIG. 1 is a conceptual diagram showing an information processing terminal in an embodiment of the invention.

FIG. 1 shows a conceptual view of an information processing terminal 1 in this embodiment. Note that the discussion will be made on the assumption that the information processing terminal 1 in this embodiment is a mobile phone.

The information processing terminal 1 in this embodiment notifies a user that a call receiving sound-level set by manipulating a rotary operation unit 3 provided on a main body of the information processing terminal 1 comes to a maximum or minimum value.

<Hardware Architecture>

Next, a hardware architecture of the information processing terminal 1 in this embodiment illustrated in FIG. 1, will be described.

Figure 2:
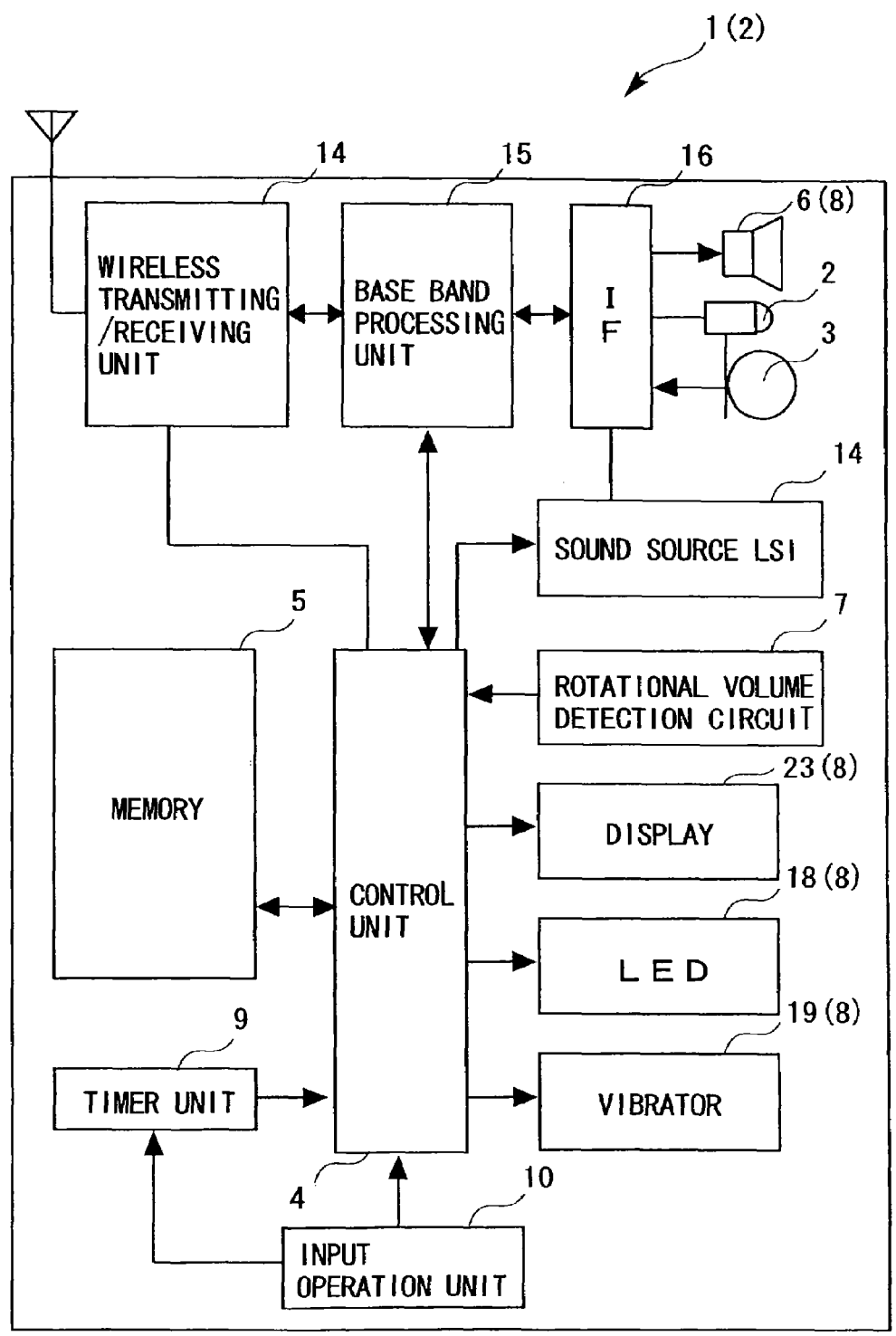
FIG. 2 is a block diagram showing functions of the information processing terminal in this embodiment.

FIG. 2 is a block diagram showing functions of the information processing terminal 1 according to this embodiment. The information processing terminal 1 in this embodiment includes a control unit 4 for controlling the whole of the information processing terminal 1, a memory 5 for storing a content of control and other pieces of data, the rotary operation unit 3 for setting the call receiving sound-level of the mobile phone 2 through its rotating operation, an output unit for outputting a result of setting the call receiving sound-level by this rotary operation unit 3, and a rotational volume detection circuit 7 (rotational volume measuring unit) for measuring a rotational volume of the rotary operation unit 3.

This output unit includes a loudspeaker (including of a buzzer) 6 for outputting a sound, a display 23 for displaying a content of the operation, a light emitting diode 18 (which will hereinafter be abbreviated to LED 18) for emitting the light corresponding to the content of the operation, and a vibrator 19. Note that these components are controlled by the control unit 4 described above.

The information processing terminal 1 in this embodiment further includes an operation content notifying unit 8 (corresponding to an operation content notifying unit) for notifying of a value of the set call receiving sound-level outputted from the output unit in accordance with a detected result given from the rotational volume detection circuit 7.

This operation content notifying unit 8 notifies that the call receiving sound-level outputted from the output unit is set to the maximum value by the rotary operation unit 3. Types of the notification can be exemplified such as notifying by sounds, vibrations, the light and so on.

Therefore, the output unit, i.e., the loudspeaker (including the buzzer) 6, the vibrator 19, the LED 18 and the display 23, function as the operation content notifying unit 8 in this embodiment.

Further, the information processing terminal 1 in this embodiment is provided with a timer unit 9 for setting to operate the operation content notifying unit 8 at a specified time. This timer unit 9 is set by an operation from an input operation unit 10 provided on the main body of the information processing terminal 1. Note that dial keys (numerical keys of 0 through 9 and other symbol keys) of the mobile phone can be applied to the input operation unit 10 in this embodiment.

This timer unit 9 may be constructed so as to be operated and set by voices inputted from a microphone 2.

In addition, the input operation unit 10 is capable of setting a notifying method. The notifying method may be exemplified such as a sound based notifying method, a vibration based notifying method using a vibrator, a screen luminance based notifying method, a lighting based notifying method using an LED, and so forth.

Further, the rotary operation unit 3 is constructed so that the call receiving sound-level increases to its maximum value as this operation unit 3 rotates clockwise and decreases down to its minimum value as it rotates counterclockwise.

Figure 3:
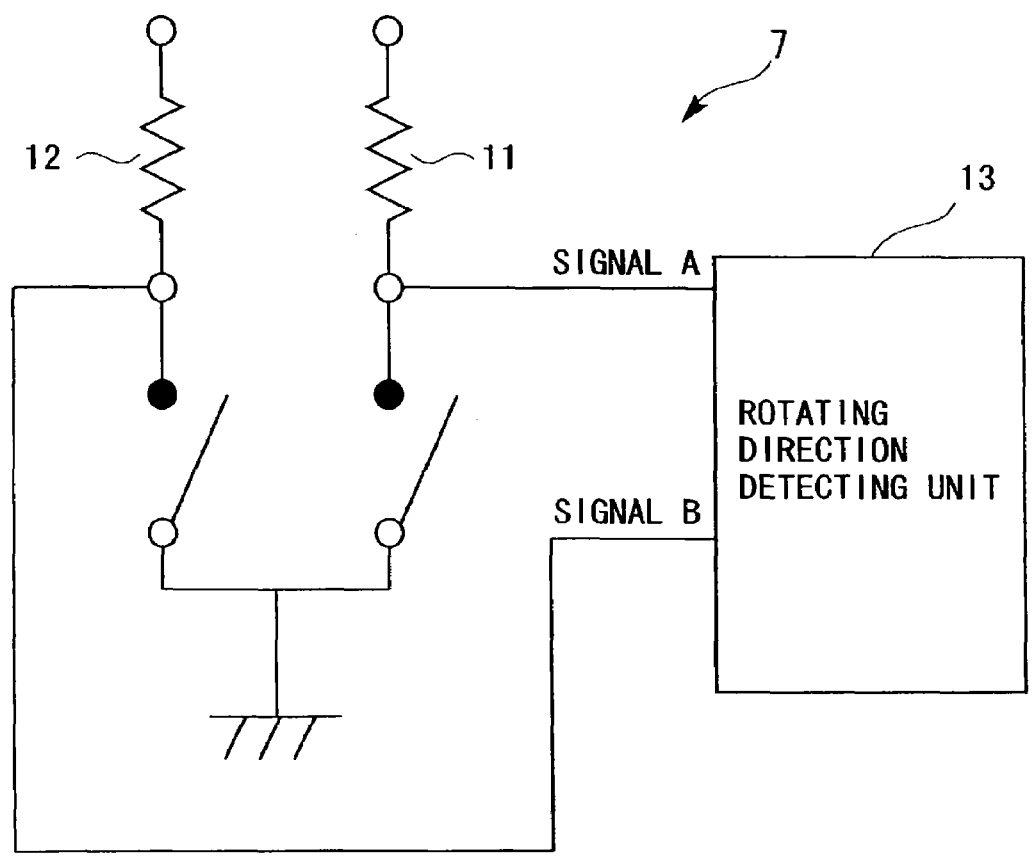
FIG. 3 is a circuit diagram of a rotary operation unit in this embodiment.

The rotational volume detection circuit 7 sets the call receiving sound-level of this rotary operation unit 3. As shown in FIG. 3, the rotational volume detection circuit 7 includes a rotary switch A 11 for increasing the call receiving sound-level, a rotary switch B 12 for decreasing the call receiving sound-level, and a rotating direction detecting unit 13 for detecting a rotating direction based on signals transmitted from these switches.

For instance, when the rotary operation unit 3 rotates clockwise, the rotary switch A 11 is switched ON, and a signal from the rotary switch A 11 is transmitted to the rotating direction detecting unit 13 for detecting the rotating direction.

Then, the rotating direction detecting unit 13 detects that this signal is a signal given from the rotary switch A 11. Upon receiving this detected result, the control unit 4 performs control for increasing the call receiving sound-level.

While on the other hand, when the rotary switch B 12 is switched ON, and its signal is transmitted to the rotating direction detecting unit 13, in which case the control unit 4 performs control for decreasing the call receiving sound-level.

Moreover, the rotary operation unit 3 illustrated in FIG. 2 is capable of increasing a volume of the call receiving sound level by level as it rotates through every 30 degrees. Namely, theoretically the rotary operation unit 3 is capable of raising the volume of the call receiving sound at 12 levels as it makes one rotation. The rotary operation unit 3 in this embodiment is, however, to set the volume of the call receiving sound at 8 levels. Note that the rotary operation unit 3 in this embodiment is capable of decreasing the volume of the call receiving sound level by level as it rotates counterclockwise through every 30 degrees.

Moreover, according to this embodiment, as shown in FIG. 2, the information processing terminal 1 is provided with a wireless transmitting/receiving unit 14 for transmitting and receiving for communications, and a base band processing unit 15 for processing carrier waves for the transmission and receipt from the wireless transmitting/receiving unit 14.

Moreover, the information processing terminal 1 in this embodiment is provided with an interface 16 for outputting a signal from the base band processing unit 15 to the output unit and interfacing to transmit an input signal from the rotary operation unit 3 or the microphone 2 to the base band processing unit 15.

Moreover, the interface 16 is connected to the control unit 4 via a sound source integrated circuit 17 (which will hereinafter simply be called a sound source LSI 17) for executing a process such as amplifying the signal from the control unit, and so forth.

<Screen Layout>

Next, a screen displayed on the display 23 when manipulating the rotary operation unit 3, will be explained referring to FIGS. 4 through 11.

Described at first is the screen displayed on the display 23 when manipulating the rotary operation unit 3 in a way that rotates this unit 3 so as to increase the call receiving sound-level.

Figure 4:
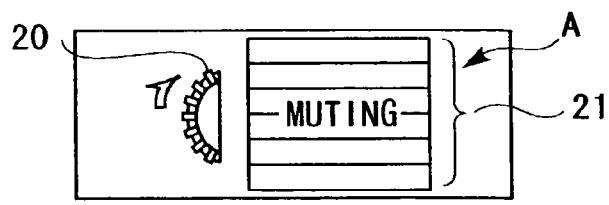
FIG. 4 is a view showing a screen A displayed on a display in this embodiment.

FIG. 4 shows a screen A displayed on the display 23 when the call receiving sound-level is set down to muting. An image 20 of the rotary operation unit 3 and six pieces of outlined boxes 21 regularly arranged for displaying stepwise the call receiving sound-levels, are displayed on this screen A. In addition, a character [Muting] is displayed at the center of the screen A.

Figure 5:
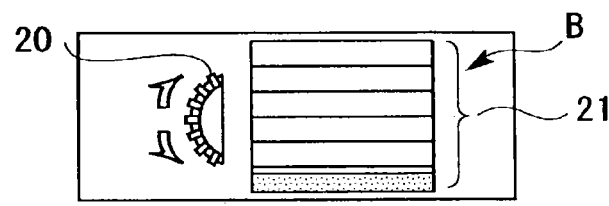
FIG. 5 is a view showing a screen B displayed on the display in this embodiment.

FIG. 5 illustrates a screen B displayed on the display 23 when the call receiving sound-level is set louder one level from the muting state. This screen B shows a state where one of the six outlines boxes 21 described above is filled with a dot pattern. Note that the character [Muting] displayed on the screen A is not displayed on the screen B.

FIGS. 6 through 10 show states where the outlined boxes 21 on the screen B illustrated in FIG. 5 are filled one by one with the dot pattern.

Figure 6:
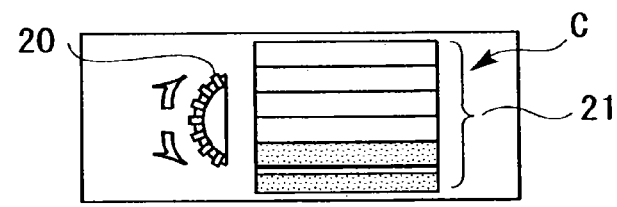
FIG. 6 is a view showing a screen C displayed on the display in this embodiment.

A screen C illustrated in FIG. 6 shows a state where two boxes among the six outlined boxes 21 are filled with the dot pattern.

Figure 7:
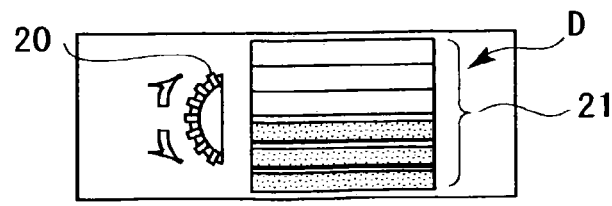
FIG. 7 is a view showing a screen D displayed on the display in this embodiment.

A screen D illustrated in FIG. 7 shows a state where three boxes among the six outlined boxes 21 are filled with the dot pattern.

Figure 8:
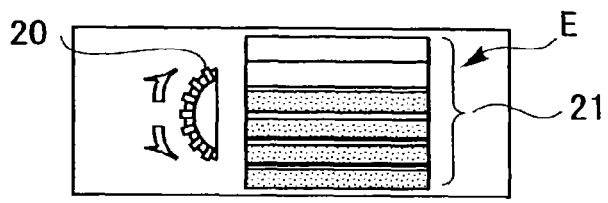
FIG. 8 is a view showing a screen E displayed on the display in this embodiment.

A screen E illustrated in FIG. 8 shows a state where four boxes among the six outlined boxes 21 are filled with the dot pattern.

Figure 9:
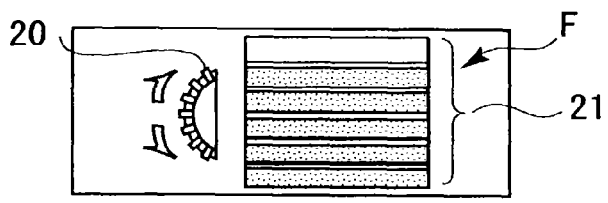
FIG. 9 is a view showing a screen F displayed on the display in this embodiment.

A screen F illustrated in FIG. 9 shows a state where five boxes among the six outlined boxes 21 are filled with the dot pattern.

Figure 10:
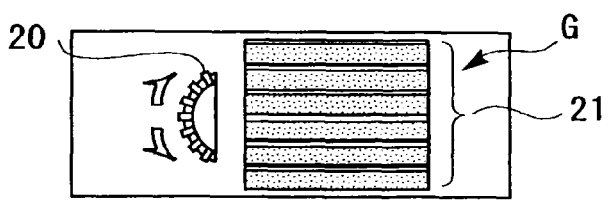
FIG. 10 is a view showing a screen G displayed on the display in this embodiment.

A screen G illustrated in FIG. 10 shows a state where all the six outlined boxes 21 are filled with the dot pattern.

Figure 11:
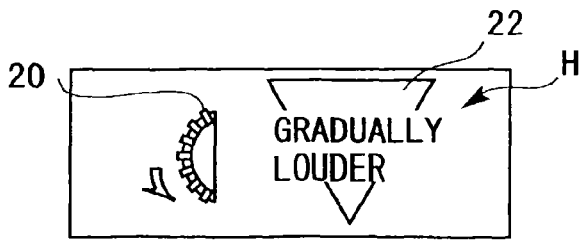
FIG. 11 is a view showing a screen H displayed on the display in this embodiment.
Figure 12A:
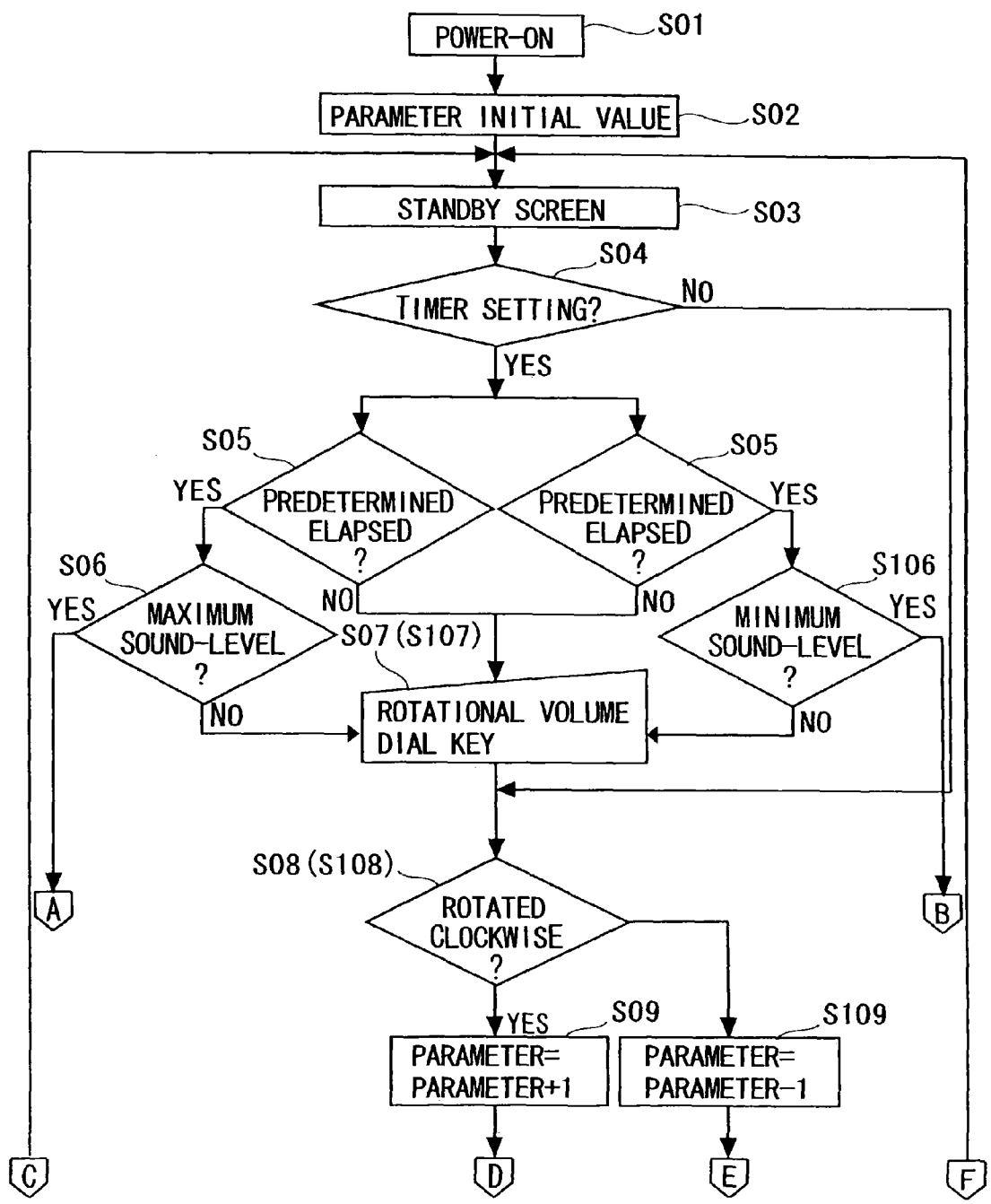
FIG. 12A is a flowchart showing operation content notifying processing steps in this embodiment.
Figure 12B:
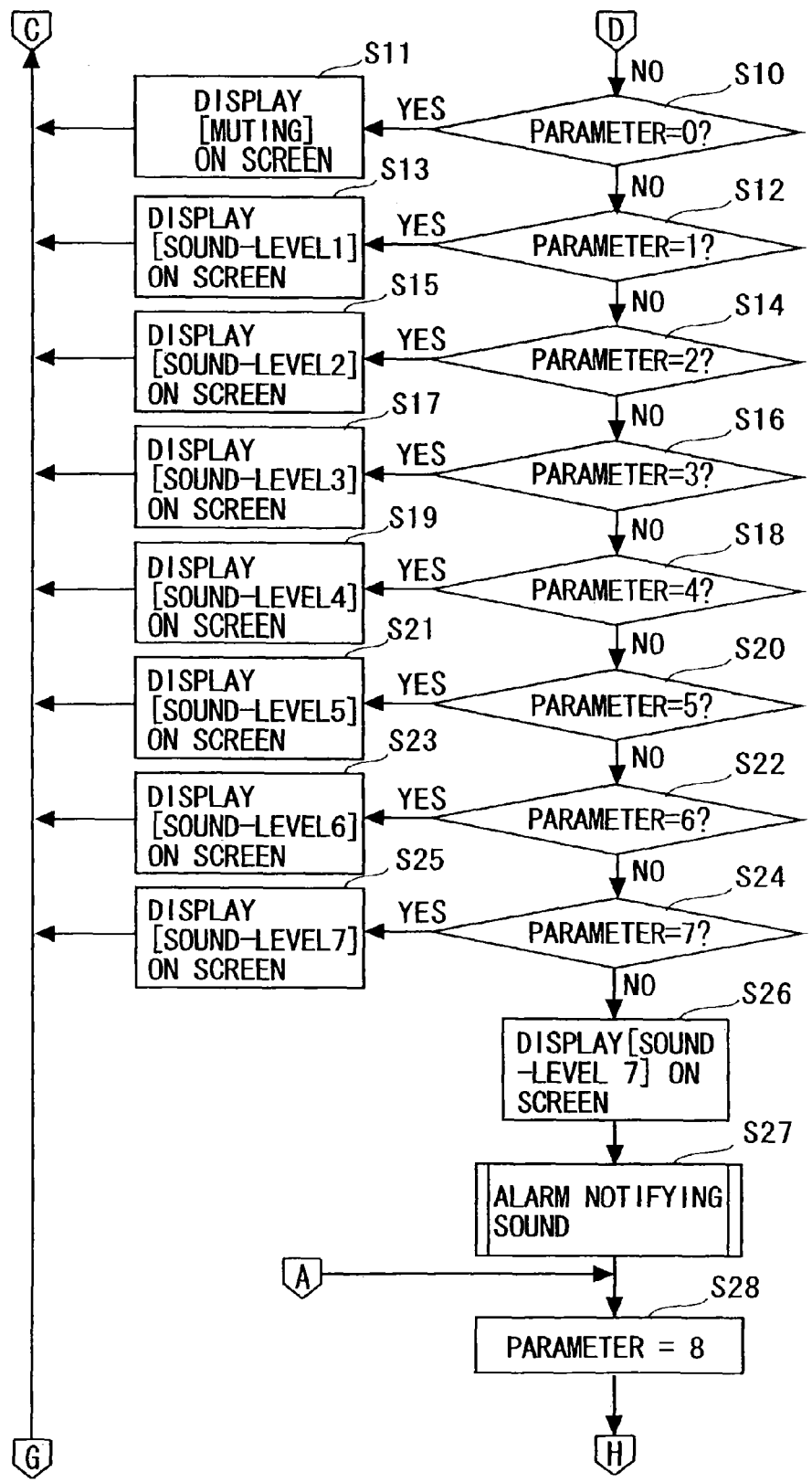
FIG. 12B is a flowchart showing operation content notifying processing steps in this embodiment.
Figure 12C:
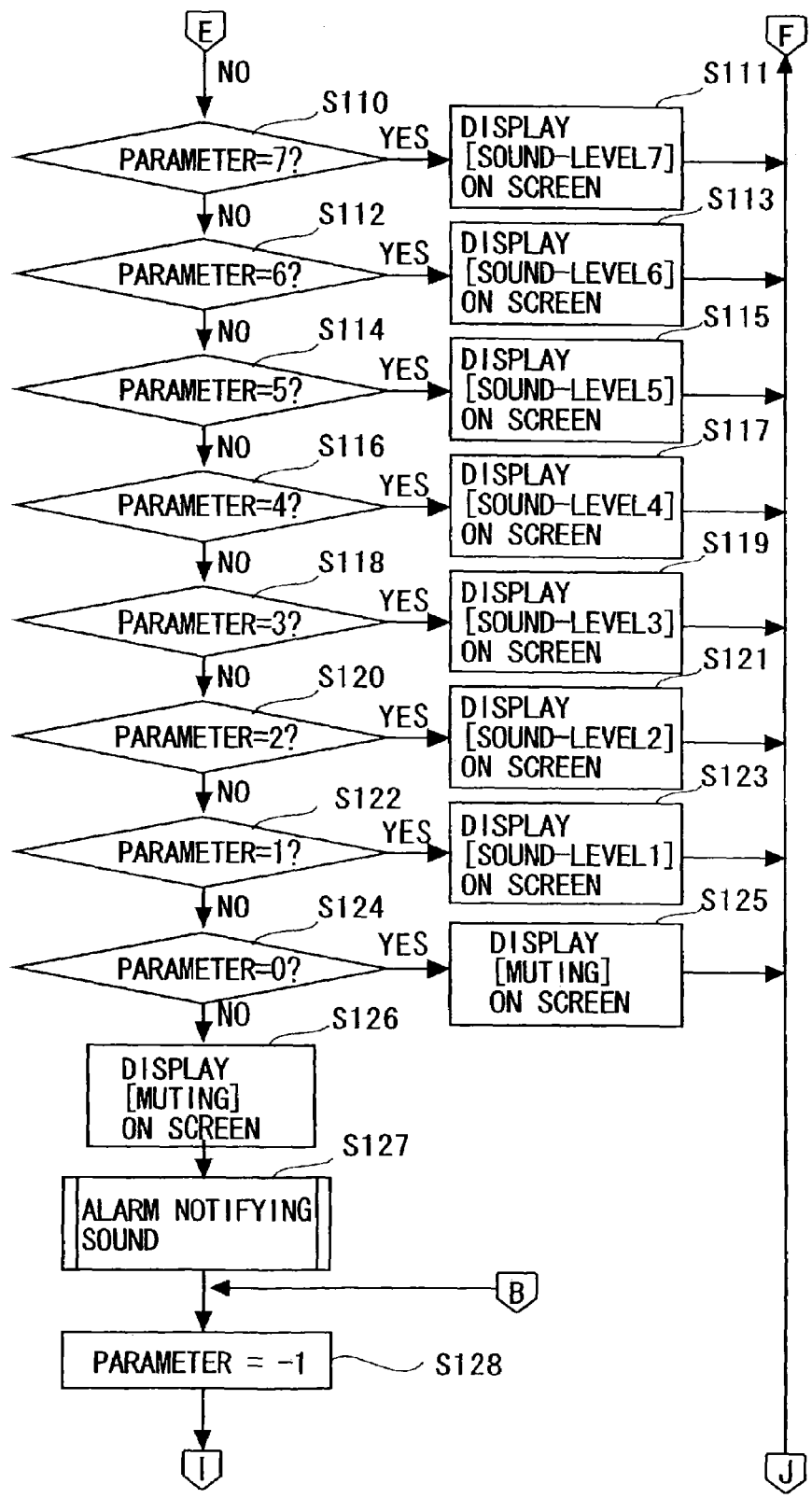
FIG. 12C is a flowchart showing operation content notifying processing steps in this embodiment.

Further, FIG. 11 shows a screen H displayed on the display 23 when the call receiving sound-level is set gradually louder. In the setting, the call receiving sound will be output gradually lauder with outputting the sound. The image 20 of the rotary operation unit 3 and an inverted triangle are displayed substantially at the central area on this screen H. Moreover, characters [gradually louder] are displayed over this inverted triangle.

What has been discussed so far is the description of the screen displayed on the display 23 of the information processing terminal in this embodiment when setting the call receiving sound-level from muting up to the maximum sound-level.

Further, in the case of setting the call receiving sound-level from the maximum level down to muting in a way that rotates the rotary operation unit 3, the screens A through H illustrated in FIGS. 4 through 11 are displayed on the display 23 in sequence from the screen H to the screen A.

What has been discussed thus far is the explanation of the screen displayed on the display 23 when manipulating the rotary operation unit 3.

<Operation>

Next, a control process for notifying that the call receiving sound-level is set to the maximum value on the information processing terminal, will be explained with reference to flowcharts shown in FIGS. 12A, 12B, 12C, and 13.

The operation starts based on the premise that a power source of the mobile phone 2 shown in FIG. 2 is in an ON-state (S01). Next, the control unit 4 executes a process of setting a control-related parameter back to its initial value (S02). Then, the control unit 4 executes a process of displaying a standby screen on the display 23 (S03).

Next, the control unit 4 judges whether the timer unit 9 shown in FIG. 2 establishes a setting for operating the operation content notifying unit 8 (S04). Herein, the control unit 4, when judging that the timer unit 9 has established the setting, judges whether a set time elapses or not (S05).

Then, the control unit 4, when judging in step S05 that the set time has elapsed, judges whether the call receiving sound-level is set to the maximum value (S06). Herein, if the call receiving sound-level is set to the maximum value, the control unit 4 diverts to a process of outputting an alarm in step S27.

Whereas if the control unit 4 judges in step S06 that the call receiving sound-level is not the maximum value, the control unit 4 stands by till the rotary operation unit 3 illustrated in FIG. 2 is manipulated (S07).

Further, the control unit 4, when judging in step S04 that the timer unit 9 does not yet establish the setting, advances to step S07.

Then, when the rotary operation unit 3 is manipulated, the control unit 4 judges whether the rotary operation unit 3 is rotated clockwise (S08). This is, as described above, judged based on a detection signal from the rotating direction detecting unit 13.

Herein, the control unit 4, when judging that the rotary operation unit 3 is rotated clockwise, performs control of setting the parameter of the sound source LSI 17 to plus one (+1) (S09). At this time, the control unit 4 judges whether the parameter is set to 0 or not (S10).

Herein, the control unit 4, when judging that the parameter is 0, executes control of displaying the screen A on the display 23 as shown in FIG. 4 (S11).

Further, the control unit 4, when judging in step S10 that the parameter is not 0, judges whether the parameter is 1 or not (S12).

Herein, if the parameter is 1, the control unit 4 effects control of displaying the screen B on the display 23 as shown in FIG. 5 (S13). Whereas if it is judged in step S12 that the parameter is not 1, the control unit 4 judges whether the parameter is 2 or not (S14).

Herein, if the parameter is judged to be 2, the control unit 4 performs control of displaying the screen C on the display 23 as shown in FIG. 6 (S15). Whereas if the parameter is judged not to be 2 in step S14, the control unit 4 judges whether the parameter is 3 or not (S16).

Herein, if the parameter is 3, the control unit 4 conducts control of displaying the screen D on the display 23 as shown in FIG. 7 (S17). Whereas if the parameter is judged not to be 3 in step S16, the control unit 4 judges whether the parameter is 4 or not (S18).

Herein, if the parameter is judged to be 4, the control unit 4 performs control of displaying the screen E on the display 23 as shown in FIG. 8 (S19). Whereas if the parameter is judged not to be 4 in step S18, the control unit 4 judges whether the parameter is 5 or not (S20).

Herein, if the parameter is judged to be 5, the control unit 4 effects control of displaying the screen F on the display 23 as shown in FIG. 9 (S21). Whereas if the parameter is judged not to be 5 in step S20, the control unit 4 judges whether the parameter is 6 or not (S22).

Herein, if the parameter is judged to be 6, the control unit 4 executes control of displaying the screen G on the display 23 as shown in FIG. 10 (S23). Whereas if the parameter is judged not to be 6 in step S22, the control unit 4 judges whether the parameter is 7 or not (S24).

Herein, if the parameter is judged to be 7, the control unit 4 performs control of displaying the screen H on the display 23 as shown in FIG. 11 (S25). Whereas if the parameter is judged not to be 7 in step S24, the control unit 4 effects control of displaying the screen H shown in FIG. 11 (S26).

At this time, the control unit 4, when judging that the call receiving sound-level is set to the maximum value, performs control of outputting the alarm from the loudspeaker 6 (the operation content notifying unit 8) (S27). Then, the control unit 4 outputs the alarm and thereafter sets the parameter to 8 (S28).

Subsequently, the control unit 4 judges whether a setting of the notification using the vibrator 19 is established or not (S29). Herein, the control unit 4, when judging that the setting of the notification using the vibrator 19 is established, executes control of operating the vibrator 19 (the operation content notifying unit 8) (S30).

Further, the control unit 4 judges whether a setting of the notification using the LED 18 is established or not (S31). Herein, the control unit 4, when judging that the setting of the notification using the LED 18 is established, performs control of lightening the LED 18 (the operation content notifying unit 8) (S32).

Then, the processing loops back to step S03, wherein the same processes are repeated.

Furthermore, the control unit 4, when judging that the notification using the vibrator 19 is not set, advances to step S31.

Moreover, the control unit 4, when judging that the notification using the LED 18 is not set, returns to step S03, wherein the processes described above are repeated.

What has been discussed so fat is the explanation of the processing steps for notifying that the call receiving sound-level is set to the maximum value on the information processing terminal 1 in this embodiment.

Figure 13:
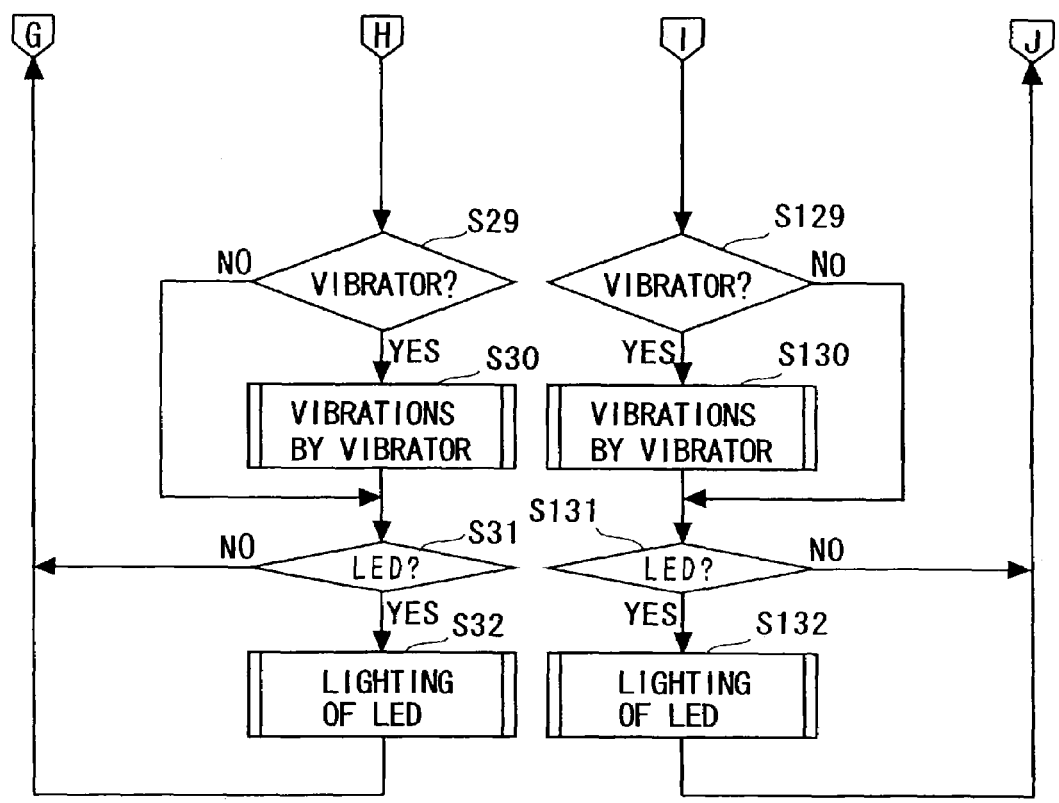
FIG. 13 is a flowchart showing the operation content notifying processing steps in this embodiment.

Next, a control process for notifying that the call receiving sound-level is set to the minimum value on the information processing terminal 1 in this embodiment, will be described referring to flowcharts shown in FIGS. 12 and 13.

Note that the control process in steps S01 though S05 is the same as the control process of notifying that the call receiving sound-level is set to the maximum value as described above, and therefore its explanation is omitted.

The control unit 4 shown in FIG. 2, when judging in step S05 that the set time has elapsed, judges whether the call receiving sound-level is set to the maximum value or not (S106). Herein, if the call receiving sound-level is set to the maximum value, the control unit 4 advances a process of outputting the alarm in step S127.

While on the other hand, the control unit 4, when judging in step S106 that the call receiving sound-level is not the maximum value, stands by till the rotary operation unit 3 shown in FIG. 2 is manipulated (S107).

Further, the control unit 4, when judging in step S04 that the timer unit 9 does not establish the setting, advances to step S107.

Upon manipulating the rotary operation unit 3, the control unit 4 judges whether the rotary operation unit 3 is rotated clockwise or not (S108). This is, as described above, judged based on the detection signal from the rotating direction detecting unit 13.

Herein, the control unit 4, when judging that the rotary operation unit 3 is not rotated clockwise, i.e., this unit 3 is rotated counterclockwise, executes control of setting the parameter in the sound source LSI 17 to minus one (−1) (S109). At this time, the control unit 4 judges whether the parameter is set to 7 or not (S110).

Herein, the control unit 4, when judging that the parameter is set to 7, performs control of displaying the screen H shown in FIG. 11 (S111).

Further, if the control unit 4 judges in step S110 that the parameter is not 7, the control unit 4 judges whether the parameter is 6 or not (S112).

Herein, the control unit 4, if the parameter is 6, effects control of displaying the screen G on the display 23 as shown in FIG. 10 (S113). Whereas if the parameter is judged not to be 6 in step S112, the control unit 4 judges whether the parameter is 5 or not (S114).

Herein, the control unit 4, if the parameter is 5, executes control of displaying the screen F on the display 23 as shown in FIG. 9 (S115). Whereas if the parameter is judged not to be 5 in step S114, the control unit 4 judges whether the parameter is 4 or not (S116).

Herein, the control unit 4, if the parameter is 4, conducts control of displaying the screen E on the display 23 as shown in FIG. 8 (S117). Whereas if the parameter is judged not to be 4 in step S116, the control unit 4 judges whether the parameter is 3 or not (S118).

Herein, the control unit 4, if the parameter is 3, effects control of displaying the screen D on the display 23 as shown in FIG. 7 (S119). Whereas if the parameter is judged not to be 4 in step S118, the control unit 4 judges whether the parameter is 2 or not (S120).

Herein, the control unit 4, if the parameter is 6, effects control of displaying the screen C on the display 23 as shown in FIG. 6 (S121). Whereas if the parameter is judged not to be 2 in step S120, the control unit 4 judges whether the parameter is 1 or not (S122).

Herein, the control unit 4, if the parameter is 1, performs control of displaying the screen B on the display 23 as shown in FIG. 5 (S123). Whereas if the parameter is judged not to be 1 in step S122, the control unit 4 judges whether the parameter is 0 or not (S124).

Herein, the control unit 4, if the parameter is 0, executes control of displaying the screen A on the display 23 as shown in FIG. 4 (S125). Whereas if the parameter is judged not to be 0 in step S124, the control unit 4 also performs control of displaying the screen A on the display 23 as shown in FIG. 4 (S126).

At this time, the control unit 4 judges that the call receiving sound-level is set to the minimum value and therefore effects control of outputting the alarm from the loudspeaker 6 (the operation content notifying unit 8) (S127). Then, the control unit 4 sets, after outputting the alarm, the parameter to 8 (S128).

Subsequently, the control unit 4 judges whether the setting of the notification based on the vibrator 19 is established or not (S129) Herein, if the notification based on the vibrator 19 is established, the control unit 4 executes control of operating the vibrator 19 (the operation content notifying unit 8) (S130).

Further, the control unit 4 judges whether the setting of the notification based on the LED 18 is established or not (S131). Herein, the control unit 4, when judging that the notification based on the LED 18 is established, performs control of lighting the LED 18 (the operation content notifying unit 8) (S132). Then, after executing step S132, the processing loops back again to step S03, wherein the same processes are repeated.

Further, if the control unit 4 judges in step 129 that the notification based on the vibrator 19 is not set, advances to step 07.

Moreover, if the control unit 4 judges in step S131 that the notification using the LED 18 is not set, the processing loops back to step S03, wherein the processed explained above are repeated.

What has been discussed thus far is the explanation of the processing steps for notifying that the call receiving sound-level is set to the minimum value on the information processing terminal 1 in this embodiment.

As described above, the information processing terminal 1 in this embodiment is capable of readily recognizing the set level of the call receiving sound volume.

Further, the information processing terminal 1 in this embodiment is capable of notifying that the call receiving sound-level is set to the maximum and minimum values by use of the three operation content notifying units (means) such as the loudspeaker 6 outputting the sound, the vibrator 19 making the vibrations and the LED 18 emitting the light on the screen. Therefore, the user can be surely notified of the state of setting the call receiving sound-level.

Moreover, the information processing terminal 1 in this embodiment is capable of selecting the notifying unit and can be therefore utilized preferably in whatever state and environment as well.

In addition, the information processing terminal 1 in this embodiment can be preferably applied to universal-design-adopted mobile phones.

<Modified Example>

The embodiment discussed above has exemplified the architecture that the operation content notifying unit 8 is constructed including the loudspeaker (including the buzzer), the vibrator 19 and the LED 18 shown in FIG. 2, and each of these notifying units notifies of the set content of the call receiving sound-level. The embodiment of the present invention is not, however, limited to this architecture.

Other architecture for notifying can be exemplified such as utilizing the operation content notifying unit 8 as the display 23, and the user is notified of the set content in a way that changes the luminance on the screen displayed on the display 23. Another architecture is that the notification of the set content may be given in a way that changes a contrast on the screen.

<Others>

Further, this embodiment discloses the inventions that follow. Moreover, the component contained in any one of the inventions (which will hereinafter be referred to as independent claims), may be combined with the components of other dependent claims.

With the gist described above, according to the present invention, it is possible to provide the information processing terminal enabling the user to easily recognize the output state at the present. Further, according to the present invention, it is feasible to provide the information processing terminal capable of preventing an unexpected output from the terminal.

What is claimed is:

1. An information processing terminal, comprising:
a rotary operation unit provided on a terminal stored with a variety of functions and performing various operations of said terminal by a rotational operation thereof;
an output unit outputting an output based on an operation result of said rotary operation unit;
a rotational volume measuring unit measuring a rotational volume of said rotary operation unit;
an operation content notifying unit notifying of a content of the operation result causing said output in accordance with a result of measurement by said rotational volume measuring unit; and
a timer unit setting said operation content notifying unit to notify at a predetermined time,
wherein, when an output content output from said output unit is set to a maximum or minimum at said predetermined time, said operation content notifying unit notifies by an alarm that a rotational volume outputted from said output unit is a maximum or minimum; and when a rotational volume from said output unit is not set to a maximum or minimum at said predetermined time, said operation content notifying unit does not notify the content of the operation result.

2. An information processing terminal according to claim 1, wherein an output level from said output unit changes to a direction of maximum output value as said rotary operation unit rotates clockwise.

3. An information processing terminal according to claim 2, wherein the output level from said output unit changes to a direction of minimum output value as said rotary operation unit rotates counterclockwise.

4. An information processing terminal according to claim 1, wherein the output level from said output unit changes to a direction of minimum output value as said rotary operation unit rotates counterclockwise.

5. An information processing terminal according to claim 1, wherein said
rotational volume measuring unit measures an angle of rotation or the number of rotations of said rotary operation unit.

6. An information processing terminal according to claim 5, wherein said output unit is a loudspeaker for outputting a voice, and said operation content notifying unit notifies of the operation content by the voice.

7. An information processing terminal according to claim 5, wherein said rotary operation unit controls a luminance on a screen of a display device.

8. An information processing terminal according to claim 1, wherein said output unit is a loudspeaker for outputting a voice, and said operation content notifying unit notifies of the operation content by the voice.

9. An information processing terminal according to claim 8, wherein said rotary operation unit controls a level of the sound outputted from said loudspeaker.

10. An information processing terminal according to claim 1, wherein said rotary operation unit controls a luminance on a screen of a display device.

11. A storage medium readable by machine, tangibly embodying an operation content notifying program of instructions executable by the machine to perform a method comprising:

detecting an operated content from a rotation of an operation device;

measuring a rotational volume of said operation device; and notifying of the operation content causing an output in accordance with a measured result only if the operation content is set to a maximum or minimum at a predetermined time.

12. A method for an operation content notifying, said method comprising:

detecting an operated content from a rotation of an operation device;

measuring a rotational volume of said operation device; and notifying of the operation content causing an output in accordance with a measured result only if the operation content is set to a maximum or minimum at a predetermined time.

* * * * *